No. 653,948. Patented July 17, 1900.
H. F. CONDON.
WIREWORKING TOOL.
(Application filed Nov. 21, 1898.)
(No Model.) 2 Sheets—Sheet 1.
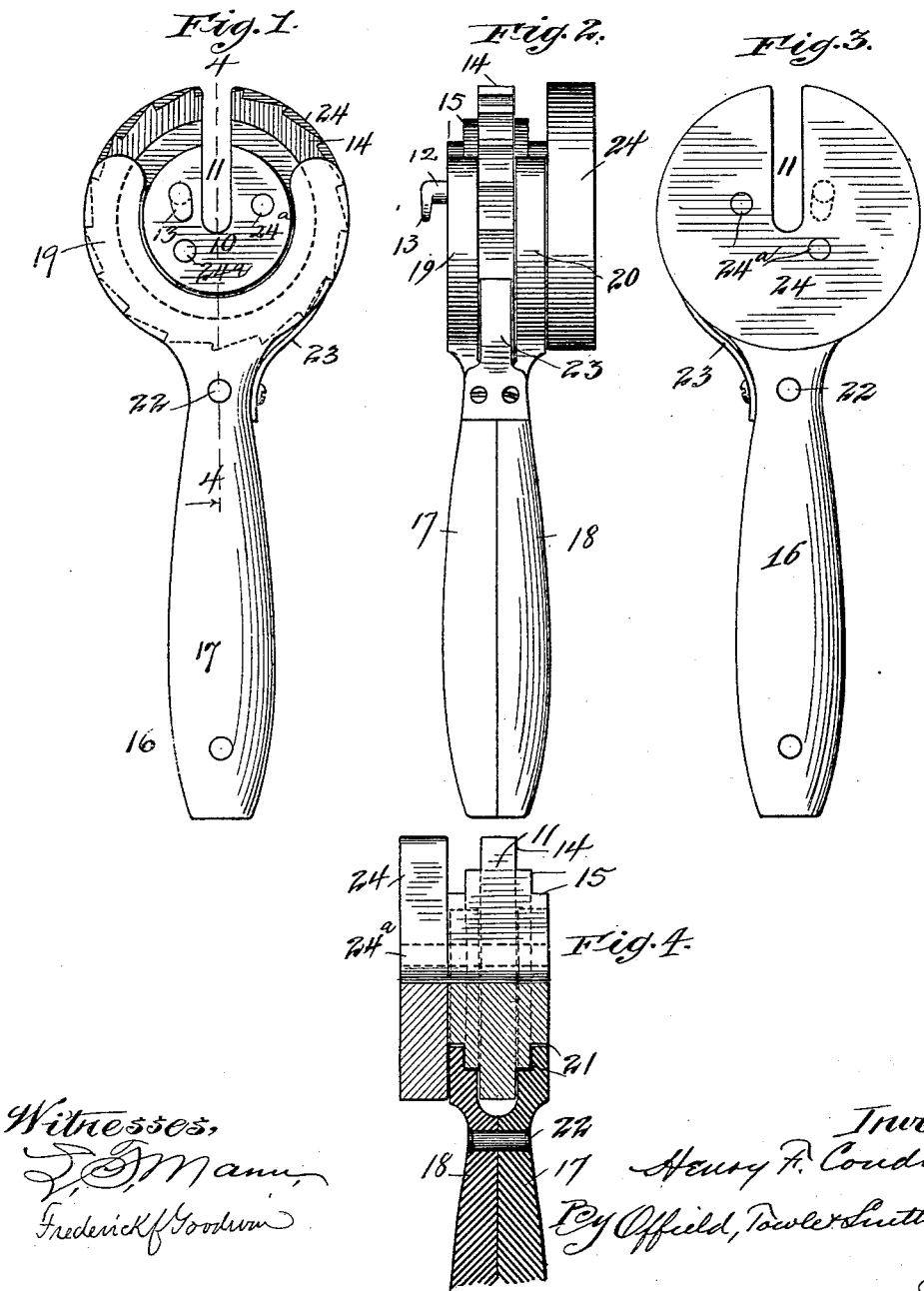

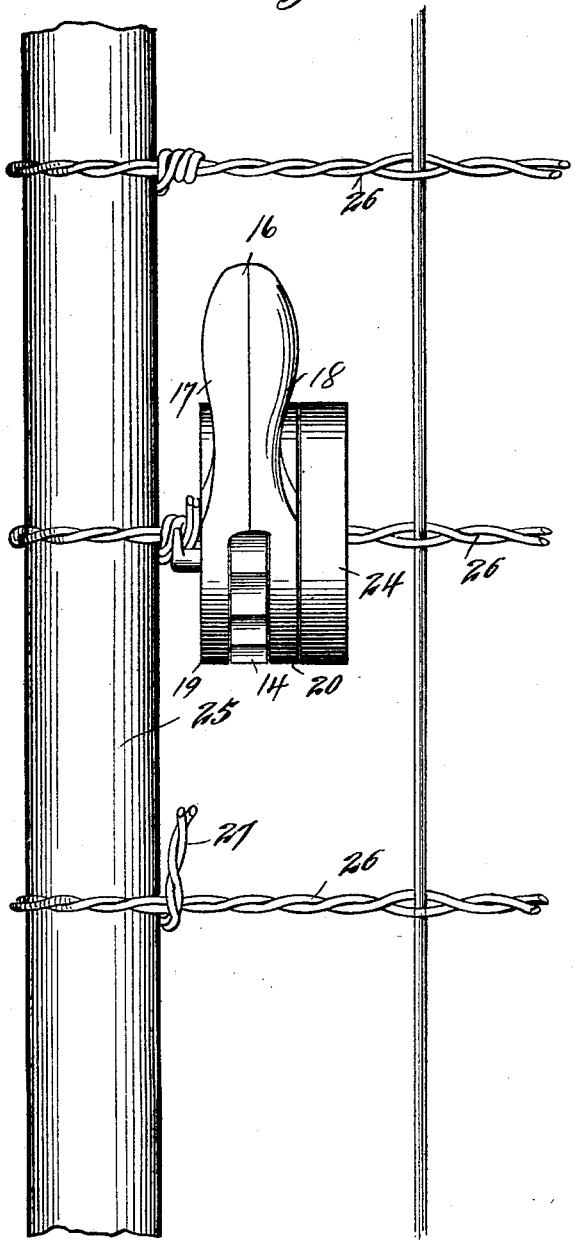

UNITED STATES PATENT OFFICE.

HENRY F. CONDON, OF DE KALB, ILLINOIS.

WIREWORKING-TOOL.

SPECIFICATION forming part of Letters Patent No. 653,948, dated July 17, 1900.

Application filed November 21, 1898. Serial No. 697,041. (No model.)

*To all whom it may concern:*

Be it known that I, HENRY F. CONDON, of De Kalb, in the county of De Kalb and State of Illinois, have invented certain new and useful Improvements in Wireworking-Tools, of which the following is a specification.

This invention relates to wireworking-tools, and has for its object to provide a tool for coiling the end of a wire or plurality of twisted wires around the body portion of the same or another wire or wires. The tool is particularly adapted for coiling the end of a loop around the body of the wire or wires from which the loop is formed, although adapted for use in other connections.

In the accompanying drawings, Figure 1 is a plan or front view of a tool embodying my invention; Fig. 2, a side view of the same; Fig. 3, a rear view; Fig. 4, a vertical sectional view taken on the line 4 4 of Fig. 1 and looking in the direction of the arrow, and Fig. 5 a view illustrating the operation of the tool.

As shown in the drawings, my improved tool comprises a coiling-disk 10, having a radial slot 11 extending from its center to its periphery and open at this latter point. On one of its faces this coiling-disk is provided with an eccentric coiling-pin 12, having its body portion substantially parallel with the axis of rotation of the disk and being provided with an angular terminal lip or flange 13. The coiling-disk is provided on its margin with a series of ratchet-teeth 14, and the body of said disk is stepped or reduced in diameter and increased in thickness, as indicated at 15.

16 indicates the handle of the tool, which is made in two parts 17 and 18, divided centrally in a plane at right angles to the axis of rotation of the disk. The ends of said handle portion adjacent to the disk are formed into two yoke-shaped pieces 19 and 20, which lie upon opposite sides of said disk and together form a bearing or socket in which said disk rotates, said parts being stepped or rabbeted, as indicated at 21, to correspond to the steps or rabbets 15 of the disk and extending around said disk for more than one-half of its circumference, as clearly shown in Fig. 1. When the disk is placed between the two yokes, the two handle portions are secured together by rivets 22 or in any other suitable manner, so that the disk is firmly held within the socket or bearing thus formed and is free to rotate therein.

23 indicates a spring-pawl secured to the handle or yoke and engaging the ratchet-teeth 14 on the periphery of the coiling-disk.

24 indicates a holding-disk secured, as by pins 24ᵃ, to that face of the coiling-disk opposite to the one on which the coiling-pin is located and serving as a means for holding said coiling-disk stationary during the return movement of the handle and pawl.

The tool just described is particularly devised for the purpose of coiling the free ends of wires constituting parts of wire gates or fences, and the application thereof will be readily understood from an examination of Fig. 5, wherein 25 represents a portion of the frame of a metallic gate or of a fence-post, and 26 the wires, intertwisted in pairs, which form the body of the panel of the gate or fence, the ends being looped around the part 25 and leaving free ends 27, which, as shown in the lower portion of Fig. 5, project and are to be coiled around the body of the wire 26, adjacent to the part 25. The tool is applied to the wire 26 by means of the slot 11 immediately adjacent to the projecting ends 27 and is then rotated around the wires 26 as a center by means of the handle 16. This movement continues until an adjacent wire arrests the movement of the handle or until the handle has been moved as far as convenient. The coiling-disk is then held stationary by means of the holding-disk 24, which is grasped and held stationary by one hand of the operator for this purpose, while the handle 16 is retracted to its original position, the spring-pawl 23 slipping over the ratchet-teeth 14, whereupon by reversing the movement of the coil the disk may be again advanced, as already described. During the rotation of the disk the coiling-pin 12 engages the ends 27 of the wire and coils them around the body thereof in the manner illustrated in the central and upper portions of Fig. 5, the lip or flange 13 preventing said ends from slipping off the pin during this operation. After the ends of the wire have been coiled the tool may be slipped off the body of the wire by means of the slot 11 and applied to the next wire to be coiled. In this manner the projecting ends of the loops may be coiled with great rapidity and ease.

I have described the tool as applied to the coiling of a particular portion of a particular structure; but it is obvious that it may be employed in other structures than that chosen for purposes of illustration. It is also obvious that the details of construction hereinbefore set forth may be varied without departing from the principle of my invention, and I therefore do not wish to be understood as limiting myself to the precise details shown and described.

I claim—

1. A wireworking-tool, comprising a radially-slotted coiling-disk provided with a series of ratchet-teeth and having on one of its faces an eccentric coiling-pin and having connected to its other face a holding-disk adapted to be grasped by the hand of the operator, in combination with a handle having a bearing inclosing the greater portion of the margin of the coiling-disk, the coiling-pin and holding-disk lying outward beyond the handle on opposite sides thereof and said handle being provided with a pawl to engage the ratchet-teeth of the coiling-disk, substantially as described.

2. A wireworking-tool, comprising a radially-slotted coiling-disk having an eccentric coiling-pin and peripheral ratchet-teeth, the body of said disk being stepped or rabbeted as described, and a two-part handle portion having terminal yokes correspondingly stepped or rabbeted extending around the marginal portions of the faces of the disk for more than one-half of its circumference, whereby the working face and ratchet-teeth of the disk are left exposed and the slot thereof accessible, said handle portion being provided with a spring-pawl to engage the ratchet-teeth, substantially as described.

3. A wireworking-tool, comprising a radially-slotted coiling-disk having an eccentric coiling-pin on one face and peripheral ratchet-teeth, the body of said disk being stepped or rabbeted, a two-part handle divided on a plane at right angles to the axis of rotation of the disk and having terminal yokes stepped or rabbeted to conform to the body of the disk and extending around the marginal portions of the faces of the same for more than one-half of its circumference, said handle portion being provided with a pawl to engage the ratchet-teeth, and a holding device secured to the other face of the disk, substantially as described.

HENRY F. CONDON.

Witnesses:
FREDERICK C. GOODWIN,
IRVINE MILLER.